United States Patent
Ng

(10) Patent No.: US 11,280,032 B2
(45) Date of Patent: Mar. 22, 2022

(54) MANUFACTURING METHOD FOR KNITTED FABRIC HAVING HEAT GENERATING FUNCTION

(71) Applicant: KnitWarm Limited, Hong Kong (CN)

(72) Inventor: Kam Kuen Ng, Hong Kong (CN)

(73) Assignee: KnitWarm Limited, Hong Kong (CN)

(*) Notice: Subject to any disclaimer, the term of this patent is extended or adjusted under 35 U.S.C. 154(b) by 518 days.

(21) Appl. No.: 16/386,345

(22) Filed: Apr. 17, 2019

(65) Prior Publication Data

US 2019/0335545 A1 Oct. 31, 2019

(51) Int. Cl.
*D04B 7/04* (2006.01)
*B32B 5/02* (2006.01)
(Continued)

(52) U.S. Cl.
CPC ............ *D04B 7/04* (2013.01); *B32B 5/026* (2013.01); *D04B 1/102* (2013.01); *D04B 1/24* (2013.01); *D04B 7/24* (2013.01); *H05B 3/345* (2013.01); *B32B 2250/20* (2013.01); *B32B 2307/302* (2013.01); *D10B 2501/00* (2013.01)

(58) Field of Classification Search
CPC .......... D04B 1/102; D04B 1/12; D04B 1/123; D04B 1/126; D04B 1/22; D04B 1/24; D04B 7/04; D04B 7/14; D04B 7/18; D04B 7/24; D04B 7/30; H05B 3/345; B32B 5/12; B32B 5/026
See application file for complete search history.

(56) References Cited

U.S. PATENT DOCUMENTS

| | | | | |
|---|---|---|---|---|
| 3,668,898 A | * | 6/1972 | Betts | D04B 1/246 66/70 |
| 5,692,399 A | * | 12/1997 | Takahashi | D04B 1/22 66/170 |
| 6,160,246 A | * | 12/2000 | Rock | D04B 1/04 219/529 |

(Continued)

FOREIGN PATENT DOCUMENTS

| | | |
|---|---|---|
| CN | 201186980 Y | 1/2009 |
| CN | 102251328 A | 11/2011 |

(Continued)

OTHER PUBLICATIONS

Extended European Search Report of EP Application No. 19170166.3 issued from the European Patent Office (EPO) dated Sep. 3, 2019.

*Primary Examiner* — Danny Worrell
(74) *Attorney, Agent, or Firm* — Spruson & Ferguson (Hong Kong) Limited

(57) ABSTRACT

A knitted fabric having a heat generating function has a four-layer structure and can be knitted by a flat knitting machine. Knit stitching is used to knit first and second layers such that the second layer is fully covered under the first layer. Tuck stitching is used to knit the third layer such that one stitch is made to the third layer per a preset number of stitches made to each of first and second layers. Knit stitching is used to knit the fourth layer. After knitting, the fabric is soaked with water and spin-dried to form protrusions, spatially distributed as a centered rectangular lattice, on fabric surface. The second layer is electrically conductive for generating heat and is hidden inside the fabric. This layer is not easily hooked by a user during use and cleaning. The fabric is elastic and soft, and provides a comfortable feeling to the user.

4 Claims, 6 Drawing Sheets

(51) Int. Cl.
*H05B 3/34* (2006.01)
*D04B 1/10* (2006.01)
*D04B 1/24* (2006.01)
*D04B 7/24* (2006.01)

(56) References Cited

U.S. PATENT DOCUMENTS

| | | | | |
|---|---|---|---|---|
| 6,770,854 | B1* | 8/2004 | Keane | H05B 3/342 |
| | | | | 219/212 |
| 7,038,177 | B2* | 5/2006 | Rock | D04B 1/04 |
| | | | | 219/529 |
| 2001/0019050 | A1* | 9/2001 | Rock | H05B 3/347 |
| | | | | 219/545 |
| 2001/0022298 | A1* | 9/2001 | Rock | D04B 1/04 |
| | | | | 219/545 |
| 2005/0061802 | A1* | 3/2005 | Rock | D02G 3/441 |
| | | | | 219/545 |
| 2008/0245786 | A1* | 10/2008 | Sharma | H05B 3/347 |
| | | | | 219/529 |
| 2008/0290080 | A1* | 11/2008 | Weiss | H05B 3/34 |
| | | | | 219/202 |
| 2012/0144561 | A1* | 6/2012 | Begriche | D04B 1/22 |
| | | | | 2/243.1 |
| 2019/0335545 | A1* | 10/2019 | Ng | D04B 1/102 |
| 2019/0344477 | A1* | 11/2019 | Huffa | B29B 11/16 |
| 2020/0040492 | A1* | 2/2020 | Pilz | D04B 1/123 |
| 2021/0172101 | A1* | 6/2021 | Jayasundara | D04B 1/16 |

FOREIGN PATENT DOCUMENTS

| | | |
|---|---|---|
| CN | 202104224 U | 1/2012 |
| CN | 106982479 A | 7/2017 |
| DE | 4239068 A1 | 5/1994 |
| DE | 102006038611 A1 | 2/2008 |
| EP | 1699266 A1 | 9/2006 |
| EP | 3141646 A1 | 3/2017 |

* cited by examiner

Before knitting starts, the first, second, third and fourth fabric layers are arranged on a flat knitting machine having an upper bed and a lower bed. The first and second fabric layers are arranged on the upper bed, the third layer on both the upper and lower beds, and the fourth layers on the lower bed.

↓ S1

The first, second, third and fourth fabric layers are knitted to form the knitted fabric. Knit stitching is used to knit the first and second fabric layers. Tuck stitching is used to knit the third fabric layer. Knit stitching is also used to knit the fourth fabric layer.

↓ S2

After knitting is finished, the fabric is soaked with water. Then the fabric is placed in a spin dryer for drying the fabric so as to form protrusions on a surface of the fabric. The protrusions that are formed are spatially distributed as a centered rectangular lattice.

MANUFACTURING METHOD FOR KNITTED FABRIC HAVING HEAT GENERATING FUNCTION

CROSS-REFERENCE TO RELATED APPLICATION

This application claims priority to Chinese Patent Application No. 2018010395645.8, filed on Apr. 27, 2018, the disclosure of which is incorporated by reference herein in its entirety.

TECHNICAL FIELD

The present invention generally relates to the technical field of textiles. In particular, the present invention relates to a knitted fabric having a heat generating function, and a method for manufacturing the knitted fabric.

BACKGROUND

There are many commercially available heat-generating textile products nowadays. However, most of them are blend knitted or interwoven with two yarns, where one yarn is of a heat-generating fiber and the other one is a non-heat-generating fiber. An electrically conductive yarn is prone to be exposed the fabric surface. The electrically conductive yarns quickly generate heat when powered, and are prone to contact the skin of a user. Due to a high temperature reached by the conductive yarn, the user is likely to be skin-burned or to feel uncomfortable. There is a need in the art to newly design a heat-generating textile product configured to avoid a user from touching a conductive yarn of the product.

In addition, most of the batteries used for many commercially available heat-generating textile products are specifically made and are not for general purpose. It greatly reduces the convenience and comfort to the user. It is desirable if general-purpose batteries can be used for the above-mentioned newly designed textile product.

SUMMARY

In order to address the above-mentioned technical problems, the present invention provides a knitted fabric having a heat generating function and a method for manufacturing this fabric.

The knitted fabric comprises first, second, third and fourth fabric layers sequentially arranged from top to bottom. The first and second fabric layers are knitted to form uniformly distributed protrusions, and the second fabric layer is fully covered under the first fabric layer. The third fabric layer is knitted such that one stitch is made to the third fabric layer per a preset number of stitches made to each of the first and second fabric layers, whereby the protrusions are spatially distributed as a centered rectangular lattice. In addition, the second fabric layer is electrically conductive such that when the second fabric layer is electrically energized, air trapped inside the protrusions is heated up, causing the knitted fabric to generate heat and to form a heat generating zone.

In certain embodiments, the first fabric layer has a density of stitches same as that of the second fabric layer.

In certain embodiments, the preset number of stitches is six.

In certain embodiments, a metal button electrically connected to the second fabric layer is disposed on each side of the heat generating zone of the knitted fabric.

In certain embodiments, the knitted fabric further comprises a three-port USB connector. The three-port USB connector comprises a USB end and other two ends. The USB end is used for connecting to an external power supply. The other two ends are connected to respective metal buttons on both sides of the heat generating zone to supply power to the second fabric layer.

In certain embodiments, the three-port USB connector is provided with a control switch for adjusting a duty cycle of power supply to control power outputted from the external power supply to the second fabric layer.

In certain embodiments, the first, third and fourth fabric layers are electrically non-conductive.

In certain embodiments, a material that forms the first, third or fourth fabric layer is selected from cotton, nylon, wool, hemp, silk, rayon, or a combination thereof.

The method for manufacturing the disclosed knitted fabric comprises the following steps.

Before knitting starts, the first, second, third and fourth fabric layers are arranged on a flat knitting machine having an upper bed and a lower bed. In particular, the first and second fabric layers are arranged on the upper bed, the third fabric layer on both the upper and lower beds, and the fourth fabric layer on the lower bed.

The first, second, third and fourth fabric layers are knitted to form the knitted fabric. Knit stitching is used to knit the first and second fabric layers such that the second fabric layer is fully covered under the first fabric layer. Tuck stitching is used to knit the third fabric layer such that one stitch is made to the third fabric layer per a preset number of stitches made to each of the first and second fabric layers. Knit stitching is also used to knit the fourth fabric layer.

After knitting is finished and the knitted fabric is formed, the knitted fabric is soaked with water having a first preset temperature for a first preset time. Then the knitted fabric is placed in a spin dryer for drying the knitted fabric at a preset rotating speed and a second preset temperature for a second preset time so as to form protrusions on a surface of the knitted fabric. The protrusions that are formed are spatially distributed as a centered rectangular lattice.

In certain embodiments, the preset number of stitches is six.

In certain embodiments, the first preset temperature ranges from 60° C. to 80° C., and the first preset time ranges from 12 min to 15 min.

In certain embodiments, the second preset temperature is 80° C., the preset rotating speed is 1200 r/min, and the second preset time ranges from 45 min to 60 min.

The conductive fabric layer according to the invention is hidden in the middle of the knitted fabric without being exposed to outside. Advantageously, the conductive fabric layer is not easily hooked by a user during use and cleaning. The disclosed knitted fabric is elastic and soft, and provides a comfortable feeling to the user.

BRIEF DESCRIPTION OF THE DRAWINGS

FIG. 6 depicts a flowchart showing steps of a method for manufacturing the disclosed knitted fabric in accordance with certain embodiments of the present invention.

DETAILED DESCRIPTION

The technical solutions according to the embodiments of the present invention are hereinafter described in detail with reference to the accompanying drawings. It should be noted that the embodiments described herein are by way of example only, and are not intended to be limiting. Variations of the disclosed knitted fabric and method obtained without any creative effort by a person of ordinary skill in the art based on any of the embodiments disclosed herein fall within the scope of the present invention.

The following terms are used herein in the specification and appended claims. "A knit stitch", also commonly known as "a plain stitch", is a basic stitch in knitting, and is created by pulling a loop of yarn from the back of a fabric to the front through a previous stitch. "Knit stitching" is a methodology for constructing a fabric by interlocking series of loops of one or more yarns with knit stitches. "A tuck stitch" is made when a needle holding its loop also receives a new loop. "Tuck stitching" is a methodology for constructing a fabric by interlocking series of loops of one or more yarns with tuck stitches. "Flat knitting" is a method for producing a knitted fabric in which the work is turned periodically. That is, the fabric is worked with alternating sides facing the knitter. "A flat knitting machine" is used for flat knitting and produces flat-knitted fabrics. The flat knitting machine has needles arranged in a straight line on a needle bed, with knitting taking place from side to side. "A centered rectangular lattice" of points is an array of points where a cluster of three nearby points forms an isosceles triangle, which looks like the Chinese character "品". An example showing a layout of a centered rectangular lattice is given in U.S. Pat. No. 5,440,421.

Disclosed herein include a knitted fabric having a heat generating function, and a method for manufacturing the disclosed knitted fabric.

Figure 1:
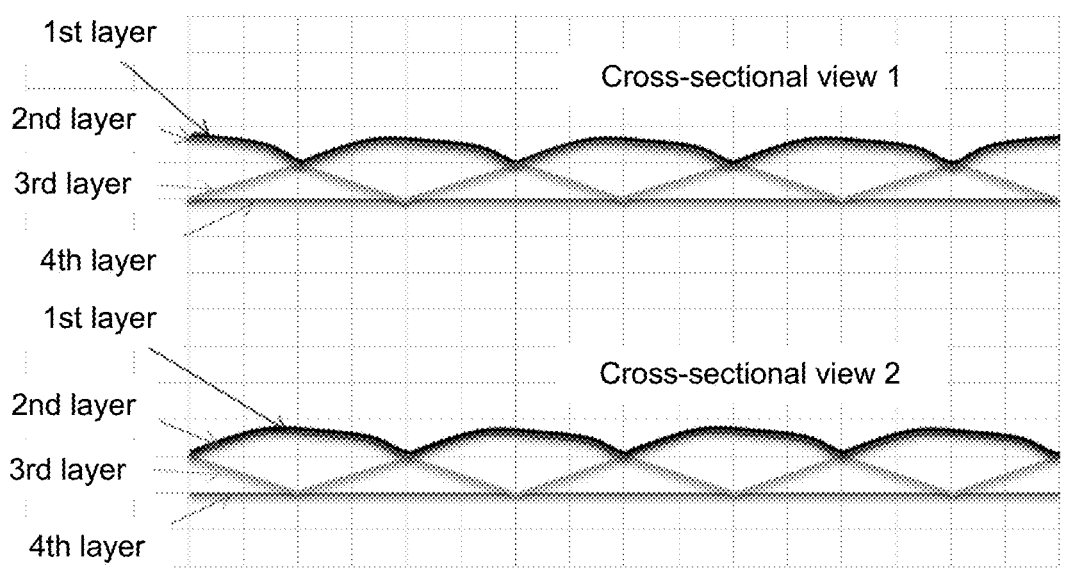
FIG. 1 depicts, for illustrating the disclosed knitted fabric, two schematic cross-sectional views of a knitted fabric having a heat generating function in accordance with certain embodiments of the present invention.

Exemplarily, the disclosed knitted fabric is illustrated with the aid of FIG. 1. FIG. 1 depicts two schematic cross-sectional views of a knitted fabric having a heat generating function in accordance with certain embodiments of the present invention. As can be seen from FIG. 1, the knitted fabric has a four-layer structure, which includes a first fabric layer, a second fabric layer, a third fabric layer and a fourth fabric layer sequentially arranged in this order. In FIG. 1, the first, second, third and fourth fabric layers are sequentially arranged from top to bottom. In the disclosed knitted fabric, the second fabric layer is electrically conductive, and is completely covered under the first fabric layer. The first and second fabric layers are shaped to form uniformly distributed protrusions on the surface of the knitted fabric, with air filled inside the protrusions. When the second fabric layer is electrically energized, the air trapped inside the protrusions is heated up to cause the knitted fabric to generate heat, and to form a heat generating zone. For example, the knitted fabric can be heated by energizing the second fabric layer by means of an external portable power supply.

When the above-mentioned fabric is knitted, the first and second fabric layers are generally arranged on an upper bed of a flat knitting machine, the fourth fabric layer is arranged on a lower bed of the machine, and the third fabric layer is arranged on both the upper and lower beds of the machine. After the aforementioned arrangement on the four fabric layers is done, knitting can be carried out. Respective conveyors for conveying the four fabric layers are operated at the same time during knitting. The first and second fabric layers are knitted according to knit stitching to form the uniformly distributed protrusions, with the second fabric layer being wrapped inside the protrusions to prevent the second fabric layer from being exposed to the outside. The fourth fabric layer is also knitted according to knit stitching. The fourth fabric layer is only joined to the third fabric layer and indirectly connected to the first and second fabric layers via the third fabric layer. The third fabric layer is tuck-stitched (viz., stitched with a tuck stitch) once per a preset number of stitches so that the protrusions are formed with a structure like a Chinese character "品", thereby obtaining a resultant fabric whose surface has fine protrusions spatially distributed as a centered rectangular lattice.

In order to make the protrusions more desirable, after the knitting is completed, the knitted fabric may be additionally soaked with water and then spin-dried. For example, the knitted fabric is immersed in water having a temperature from 60° C. to 80° C. for 12 to 15 minutes, and then transferred into a spin dryer and dried at 80° C. under a rotating speed of 1200 r/min for 45 to 60 minutes. In this way, a fabric is obtained with a surface having protrusions spatially distributed in a manner close to forming a centered rectangular lattice. The heights of these protrusions are in a range from about 0.05 mm to about 10 mm, and the interior space of the protrusions is filled with air. When the conductive fabric layer in the heat generating zone is connected to a power supply, heat is generated. The air in the protrusions is heated such that the air molecules expand to lock up the heat in the air.

The present invention utilizes three-dimensional (3D) knitting and braiding technology with a flat knitting machine to manufacture the disclosed knitted fabric. Conductive fibers in the knitted fabric are disposed at specified positions. By using an external portable power source, the conductive fibers having different resistances are energized to generate heat due to ohmic resistance.

In certain embodiments, the density of stitches made on the first fabric layer is the same as that made on the second fabric layer. During knitting, the conveyors for conveying the first and second fabric layers are operated synchronously to ensure that the second fabric layer is completely covered under the first fabric layer.

In certain embodiments, the third fabric layer is stitched with a tuck stitch once per six stitches made to each of the first and second fabric layers. That is, after the first, second and fourth fabric layers are each stitched six times to get six stitches, the third fabric layer is stitched once to get one tuck stitch. One group is thus completed. Then knitting the next group is subsequently performed.

Figure 2:
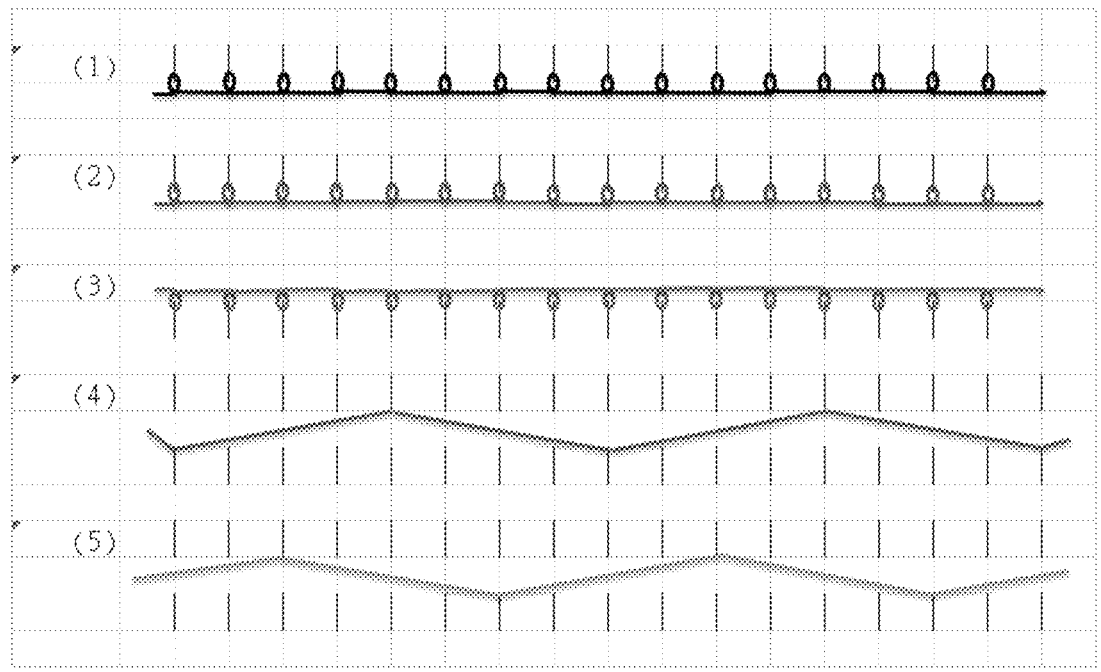
FIG. 2 depicts a process for knitting a fabric having a heat generating function in accordance with certain embodiments of the present invention.

FIG. 2 is a schematic diagram of a knitting process for braiding a knitted fabric having a heat generating function by a flat knitting machine according to certain embodiments of the present invention. Details of the knitting process are hereinafter described with reference to FIG. 2. The flat knitting machine has an upper bed and a lower bed. As shown in FIG. 2, a black vertical short line represents a stitch. Subplots (1) and (2) depict that the first and second fabric layers, respectively, are knitted according to knit stitching, where both the first and second fabric layers are placed on the upper bed. Subplot (3) indicates the fourth fabric layer, placed on the lower bed, is also knitted according to knit stitching. Subplots (4) and (5) indicate that the third fabric layer, placed on both the upper and lower beds, is knitted according to tuck stitching. The third fabric layer is tuck-stitched every time it encounters a knitting needle. In particular, subplots (4) and (5) individually show that every time after the first, second and fourth fabric layers are each stitched six times, the third fabric layer is stitched once with a tuck stitch.

Figure 3:
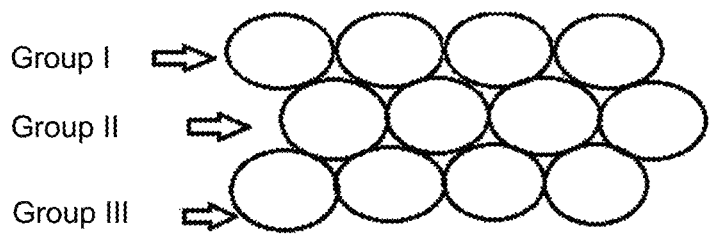
FIG. 3 is a front view of a knitted fabric according to certain embodiments of the present invention, where the knitted fabric comprises groups arranged as a centered rectangular lattice.

A process of manufacturing the disclosed knitted fabric generally comprises two steps. In the first step, every time after the first, second and fourth fabric layers are each stitched six times, the third fabric layer placed on the upper or lower bed is stitched once with a tuck stitch. That is, after six stitches are completed as shown in subplots (1), (2) and (3), the third fabric layer is tuck-stitched (viz., stitched with a tuck stitch) only once as depicted in subplot (4). In the second step, every time after the first, second and fourth fabric layers are each stitched six times, the third fabric layer placed on the two opposite beds is tuck-stitched once. That is, after six stitches are done as shown in subplots (1), (2) and (3), the third fabric layer is tuck-stitched once as shown in subplot (5). As the first step is carried out simultaneously with the second step, three needles can be moved clockwise or counterclockwise, thereby obtaining the knitted fabric with fine protrusions in accordance with any of the embodiments of the present invention. In the above description, the mentioned number of needles is used as an example for illustration and is not intended to be limiting to the present invention. Any number of needles as deemed appropriate by those skilled in the art may be used. FIG. 3 is a view schematically illustrating a knitted fabric in accordance with certain embodiments of the present invention. On the surface of the knitted fabric, fine protrusions are formed as a centered rectangular lattice.

In the foregoing description, it is mentioned that the third fabric layer is tuck-stitched once every six times of stitching the first, second and fourth fabric layers. This frequency of stitching the third fabric layer is used in a preferred embodiment of the present invention. Although this frequency is a preferred choice, the present invention is not limited to this particular choice of frequency. In practical implementation, those skilled in the art may choose to stitch the third fabric layer once every three, four, five or any times of stitching the first, second and fourth fabric layers according to actual situations.

In order to energize the knitted fabric, in certain embodiments two metal buttons are respectively provided on two sides of the heat generating zone of the knitted fabric. The two metal buttons are respectively electrically-connected to the second fabric layer. Thereby, the second fabric layer can be energized via the metal buttons to make the knitted fabric generate heat.

Figure 4:
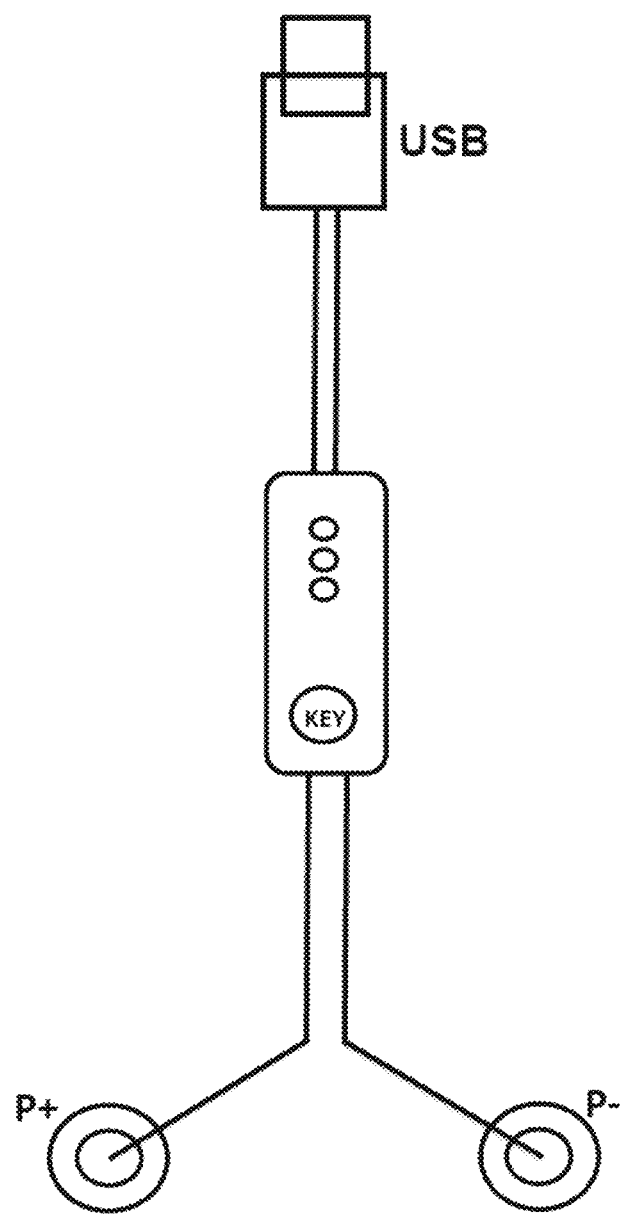
FIG. 4 depicts a schematic structural view of a three-port USB connector in accordance with certain embodiments of the present invention.

In certain embodiments, the knitted fabric further includes a three-port USB connector, the general structure of which is shown in FIG. 4. A USB end of the three-port USB connector is used to connect an external (portable) power supply. The other two ends are respectively connected to the metal buttons on both sides of the heat generating zone of the knitted fabric so as to supply power to the second fabric layer.

Preferably, the three-port USB connector is provided with a control switch (KEY button shown in FIG. 4), by which the duty cycle of the power supply (i.e. percentage of time of switching on the power supply) can be adjusted so as to control the amount of power delivered from the external power supply to the second fabric layer such that temperature adjustment can be achieved.

In order to indicate to a user whether the control switch is turned on to electrically connect the external power supply to the second fabric layer, the three-port USB connector is typically provided with an indicator lamp (the three circular components above the KEY button in FIG. 4). When the indicator lamp is lighted, it indicates that the three-port USB connector is turned on and the external power supply is connected to the second fabric layer. When the indicator lamp is off, the three-port USB connector is disconnected. At this time, the external power supply does not supply power to the second fabric layer.

Figure 5:
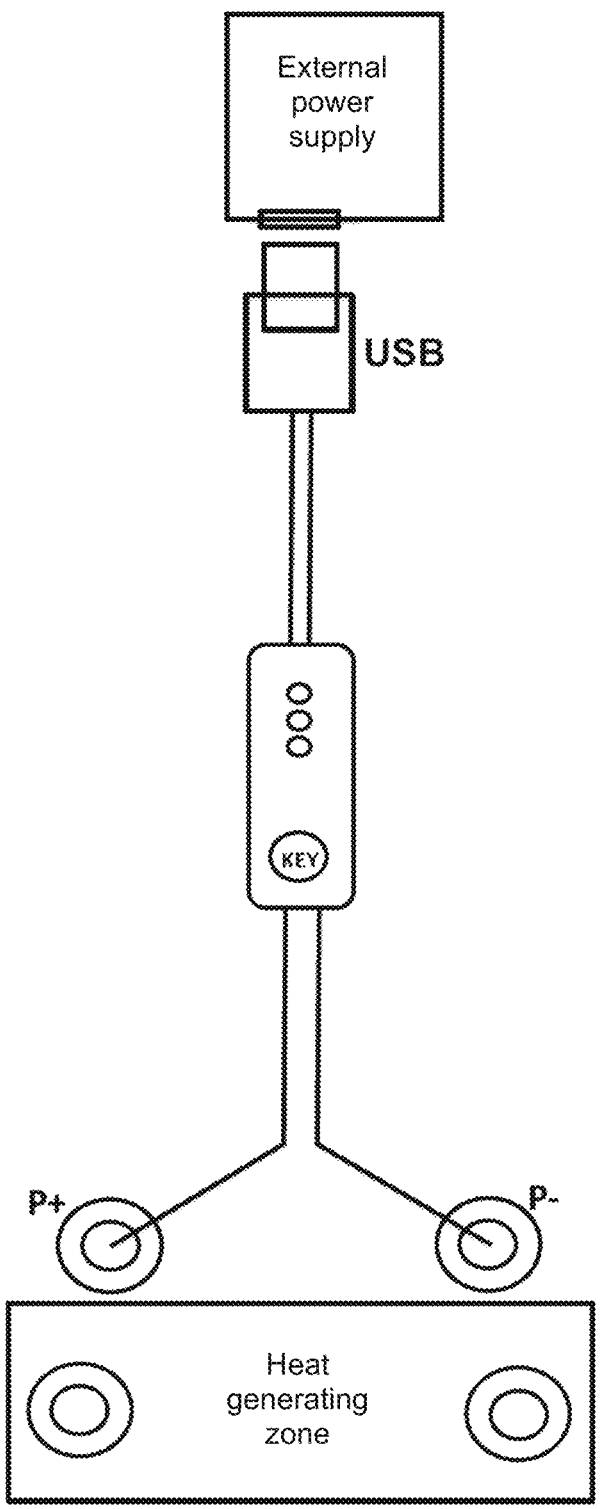
FIG. 5 depicts a schematic view for illustrating an operation of heating up the disclosed knitted fabric having the heating generating function.

FIG. 5 schematically illustrates an operation for heating the disclosed knitted fabric in accordance with certain embodiments of the present invention. The USB port of the three-port USB connector is externally connected to the power supply, and the other two ports are respectively connected to both sides of the heat generating zone of the disclosed knitted fabric by the metal buttons. After installation, the external power supply and the second fabric layer can be electrically connected via the control switch so as to heat the heat generating zone of the knitted fabric.

The first, third and fourth fabric layers disclosed above are electrically non-conductive materials. Suitable non-conductive materials include, but are not limited to, cotton, nylon, wool, hemp, silk, rayon, and a combination thereof.

The second fabric layer, which is electrically conductive, is hidden up as the middle layer of the knitted fabric without being exposed. This conductive fabric layer is not touchable by the user during use and cleaning. Furthermore, the disclosed knitted fabric is elastic and soft, and provides a comfortable feeling to the user.

FIG. 6 depicts a knitting process for manufacturing the disclosed knitted fabric by a flat knitting machine in accordance with certain embodiments of the present invention. The flat knitting machine has an upper bed and a lower bed. The knitting process is detailed as follows.

Step S1, performed before knitting starts, is to arrange the first, second, third and fourth fabric layers on the flat knitting machine. In step S1, the first and second fabric layers are arranged on the upper bed. The third fabric layer is arranged on both the upper and lower beds. The fourth fabric layer is arranged on the lower bed. After step S1 is done, knitting can be carried out.

Step S2 is to knit the first, second, third and fourth fabric layers to form the knitted fabric. In step S2, the first and second fabric layers are knitted according to knit stitching. Particularly, the first and second fabric layers are knitted such that the second fabric layer is completely covered under the first fabric layer. The third fabric layer is knitted according to tuck stitching such that one tuck stitch is made to the third fabric layer per a preset number of stitches made to each of the first and second fabric layers. The fourth fabric layer is knitted according to knit stitching. During knitting, the conveyors of the flat knitting machine for respectively conveying the four fabric layers are operated at the same time.

The fabric knitted via steps S1 and S2 has fine protrusions spatially distributed as a centered rectangular lattice on the surface of the knitted fabric. In order to make the protrusions more desirable, step S3 is added to carry out for further conditioning the knitted fabric.

Step S3 is a post-knitting step performed after the knitting is finished and the knitted fabric is formed. The knitted fabric formed in step S2 is soaked with water having a first preset temperature for a first preset time. The knitted fabric is then dried by a spin dryer. Drying is performed under a preset rotating speed at a second preset temperature for a second preset time to obtain the knitted fabric having the protrusions spatially distributed as a centered rectangular lattice on the knitted fabric's surface. Generally, the first and second preset temperatures that are selected are above the room temperature.

After spin drying, the protrusions are formed with a height from about 0.05 mm to about 10 mm. The interior region of the protrusions is filled with air. When the conductive fabric layer in the heat generating zone is connected to the power supply to generate heat, the air inside the protrusions is heated up, such that air molecules therein expand to lock up the heat in the air.

In certain embodiments, the third fabric layer is tuck-stitched once every six stitches for forming the centered rectangular lattice of protrusions.

In certain embodiments, the first preset temperature is from 60° C. to 80° C., and the first preset time is from 12 min to 15 min.

In certain embodiments, the second preset temperature is 80° C., the preset rotating speed is 1200 r/min, and the second preset time is from 45 min to 60 min.

The second fabric layer (namely, the conductive fabric layer) is knitted in the knitted fabric by using the above-disclosed method. Heat generating zones of different sizes, such as a size of 18 cm×14 cm, can be knitted based on actual needs. Moreover, the embodiments of the present invention can utilize different knitting methods in knitting the conductive fabric layer to change the size of the heat generating zone. During knitting, the first, second and fourth fabric layers are made tighter, and the third fabric layer has a length of yarn adjusted according to the size of space occupied by the protrusions. Heat generating zones of different sizes have different resistance values. In practical implementation, the resistance value of the heat generating zone of the knitted fabric wearable on a body of a user is usually between 2 ohms and 22 ohms.

Figure 7:
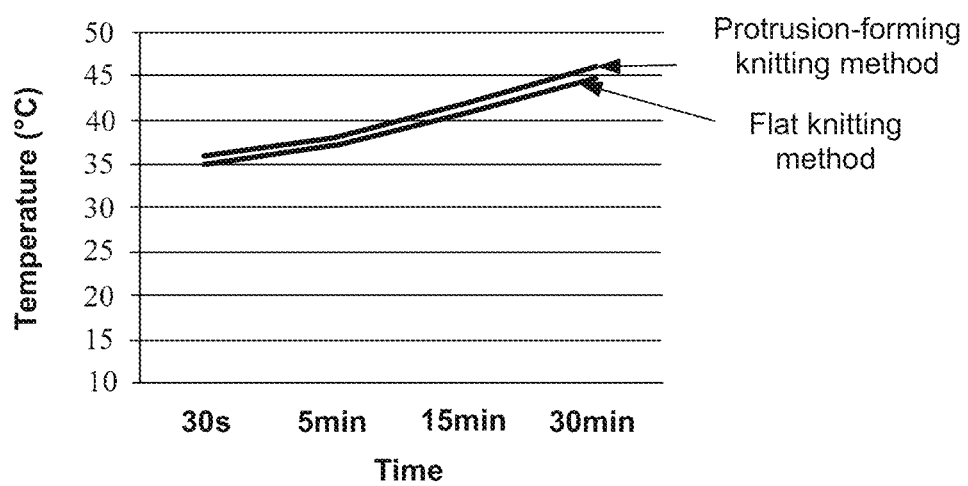
FIG. 7 shows results of testing the heat generation performance of the disclosed knitted fabric by comparing one fabric provided according to certain embodiments of the present invention and another fabric obtained by flat knitting.

The knitting process (steps S1 and S2) of the disclosed manufacturing method in accordance with certain embodiments of the present invention is a protrusion-forming knitting method. In a test, a fabric manufactured by this knitting method was compared to the one having a four-layer structure with a conductive layer therein but formed by a flat knitting method. (The difference between the two fabrics lies in using different knitting methods while the materials used in the same fabric layers of the two fabrics are the same.) The two fabrics were respectively connected to external power supplies of the same model, for example, batteries of the model 5000 mAh/5V/2~2.5 A. Results of heat performance tests for both of the fabrics are shown in FIG. 7 for comparison. The tests were carried out at a room temperature of 24° C. and a humidity of 90%. When the heat generating zones of the two fabrics obtained by the two methods were connected to the power supplies to generate heat, the fabric knitted by the protrusion-forming knitting method raised the temperature to about 36 to 41° C. in the heat generating zone within 30 to 60 seconds, and after 30 minutes, the temperature was raised to above 42° C. If different thicknesses of the conductive fabric layer are adopted, different temperatures may be reached. As shown in FIG. 7, the temperature of the fabric achieved by the protrusion-forming knitting method according to certain embodiments of the present invention is higher than that of the fabric obtained by the flat knitting method by about 1.4° C.

One of the advantages of the present invention is that the heat generating zone of the knitted fabric has metal buttons on both sides. When these buttons are connected to corresponding metal buttons on the three-port USB connector, and the USB end of the three-port USB connector is connected to an external power supply, the temperature of the heat generating zone can rapidly increase to 40° C. or above, thus meeting different requirements of different people. Since one person has a favorite temperature different from another person, a user can use the three-port USB connector disclosed in the present invention to control the duty cycle of the power supply such that the user can select a temperature suitable for him or her. Alternatively, a heat generation circuit control system may be formed by including the three-port USB connector and a wireless controller.

A conductive fabric layer knitted according to an already-existing knitting method in the art is exposed to outside and is prone to be broken, thereby resulting in failure of the heat generating zone and making it unable to generate heat or leading to unevenness in temperature over the heat generating zone. In comparison with heat generating products produced by already-existing techniques, the conductive fabric layer provided by the present invention is hidden in the middle of the knitted fabric without being exposed. Conductive fibers therein cannot be easily hooked out by the user during use and cleaning. The disclosed knitted fabric is elastic and soft, enabling the user to feel comfortable.

Those skilled in the art will appreciate that embodiments of the present invention can be embodied as a method, a system, or a computer program product. Accordingly, the present invention may take the form of an entire hardware embodiment, an entire software embodiment, or a combination of software and hardware. Moreover, the present invention can take the form of a computer program product including one or more computer-usable storage media (including, but not limited to, disk storage, CD-ROM, optical storage, etc.) for storing computer program codes.

Embodiments of the present invention have been described with reference to flowcharts and/or block diagrams of methods, devices (systems), and computer program products. It will be understood that each routine and/or block in the flowcharts and/or block diagrams and a combination of flows and/or blocks in the flowcharts and/or block diagrams may be implemented using computer program instructions. These computer program instructions can be provided to a general purpose processor, a special purpose processor, an embedded processor, or other programmable data processing devices to produce a machine such that the instructions executed by any of the aforementioned processors and programmable data processing devices implement the functions specified in a routine or routines of the flowcharts and/or block diagrams.

The computer program instructions can also be stored in a computer readable memory that can direct a computer or a programmable data processing device to operate in a particular manner, such that the instructions stored in the computer readable memory produce an article of manufacture comprising the instruction means. The instruction means implements the functions specified in a routine or routines of the flowcharts and/or block diagrams.

These computer program instructions can also be loaded onto a computer or a programmable data processing device such that a series of operational steps are performed on the computer or programmable data processing device to carry out computer-implemented processing, whereby the instructions executed on the computer or programmable data processing device implement the functions specified in a routine or routines of the flowcharts and/or block diagrams.

The principles and embodiments of the present invention have been described in connection with the specific embodiments of the present invention. The description of the above embodiments is only for the understanding of the disclosed method/knitted fabric and the core idea thereof. At the same time, for those skilled in the art, variation(s) may be made to the specific implementations and applicable scopes according to the spirit of the present invention.

What is claimed is:

1. A method for manufacturing a knitted fabric having a heat generating function, the method comprising the steps of:

arranging first, second, third and fourth fabric layers on a flat knitting machine having an upper bed and a lower bed, wherein the first and second fabric layers are arranged on the upper bed, the third fabric layer on both the upper and lower beds, and the fourth fabric layer on the lower bed;

knitting the first, second, third and fourth fabric layers to form the knitted fabric, wherein knit stitching is used to knit the first and second fabric layers such that the second fabric layer is fully covered under the first fabric layer, wherein tuck stitching is used to knit the third fabric layer such that one stitch is made to the third fabric layer per a preset number of stitches made to each of the first and second fabric layers, and wherein knit stitching is used to knit the fourth fabric layer; and after the knitted fabric is formed, soaking the knitted fabric with water having a first preset temperature for a first preset time, and then placing the knitted fabric in a spin dryer for drying the knitted fabric at a preset rotating speed and a second preset temperature for a second preset time so as to form protrusions on a surface of the knitted fabric, whereby the protrusions are spatially distributed as a centered rectangular lattice.

2. The method of claim 1, wherein the preset number of stitches is six.

3. The method of claim 1, wherein the first preset temperature ranges from 60° C. to 80° C., and the first preset time ranges from 12 min to 15 min.

4. The method of claim 1, wherein the second preset temperature is 80° C., the preset rotating speed is 1200 r/min, and the second preset time ranges from 45 min to 60 min.

* * * * *